United States Patent

[11] 3,614,720

| [72] | Inventor | Bobby R. Ludlum<br>Panama City, Fla. |
|---|---|---|
| [21] | Appl. No. | 876,510 |
| [22] | Filed | Nov. 13, 1969 |
| [45] | Patented | Oct. 19, 1971 |
| [73] | Assignee | The United States of America as represented by the Secretary of the Navy |

[54] LOGARITHMIC THREE-COLOR DISPLAY SONAR
13 Claims, 4 Drawing Figs.

[52] U.S. Cl. ................................................ 340/3 R,
340/3 C, 343/5 CD, 343/17.2 PC
[51] Int. Cl. ................................................ G01s 9/66
[50] Field of Search ................................................ 340/3, 3 C,
5, 6; 343/5 CD, 13, 17.2 PC, 17.1; 333/14

[56] References Cited
UNITED STATES PATENTS

| 2,428,351 | 10/1947 | Ayres | 340/3 C |
| 2,915,599 | 12/1959 | Ricketts | 340/3 X |
| 3,292,175 | 12/1966 | Brandon | 343/17.2 PC |
| 3,535,455 | 10/1970 | Brooks | 333/14 X |

Primary Examiner—Richard A. Farley
Attorneys—Richard S. Sciascia, Don D. Doty and William T. Skeer

ABSTRACT: The instant invention is a sonar system which incorporates a receiving transducer and a receiver having logarithmic signal compression characteristics connected thereto. A trio of signal processing channels are connected to said receiver for respectively gating and passing the target echo signals received from targets whose echo level intensities fall within a trio of predetermined amplitude ranges, with the passed signals thereof being amplified by an amplifier having signal expansion characteristics that are substantially opposite to the logarithmic compression characteristics of the aforesaid receiver. After further amplification by a video amplifier, said signals are read out by a three-color cathode-ray tube, the colors of which respectively correspond to the aforesaid trio of predetermined echo level amplitude ranges.

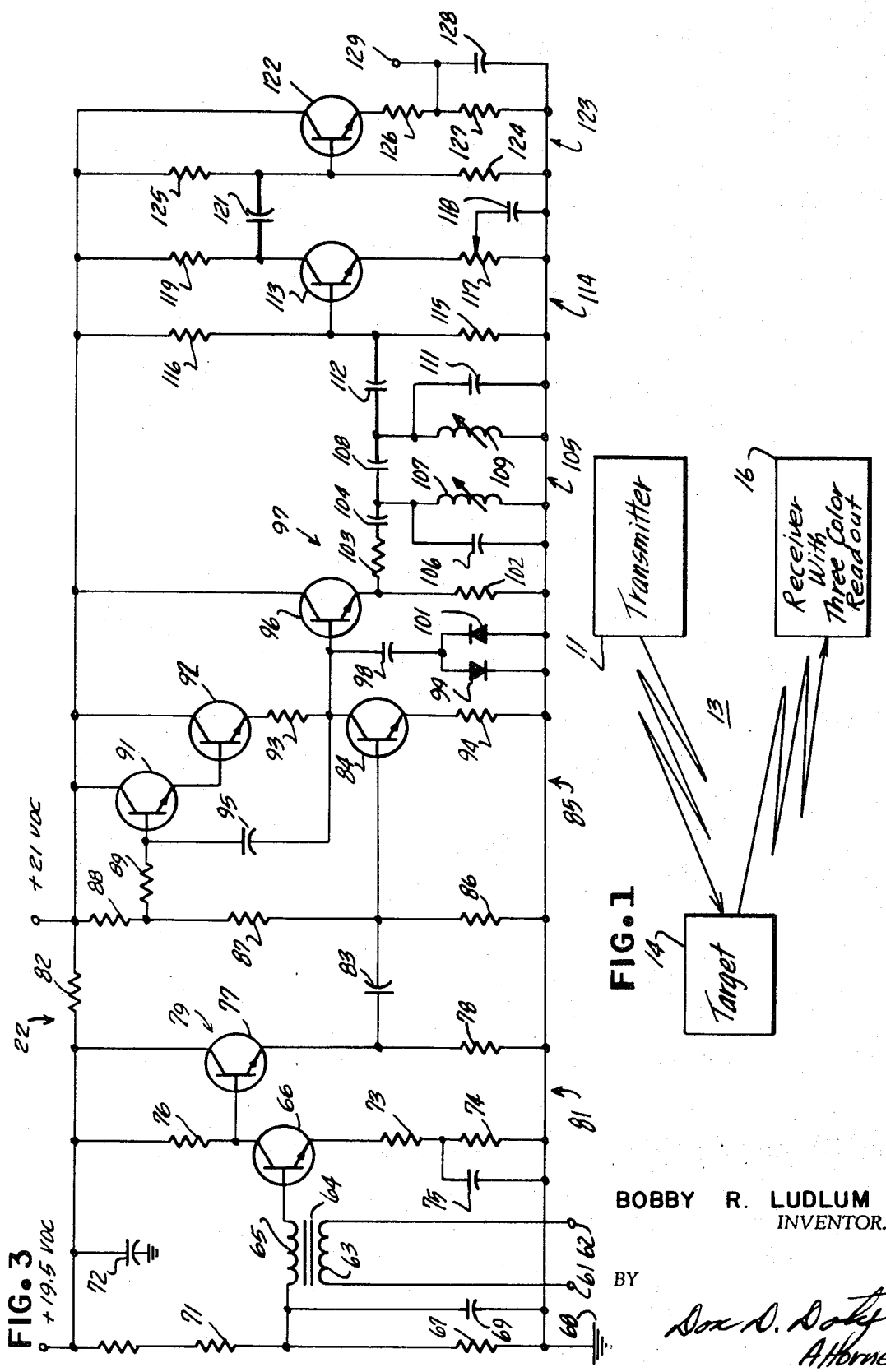

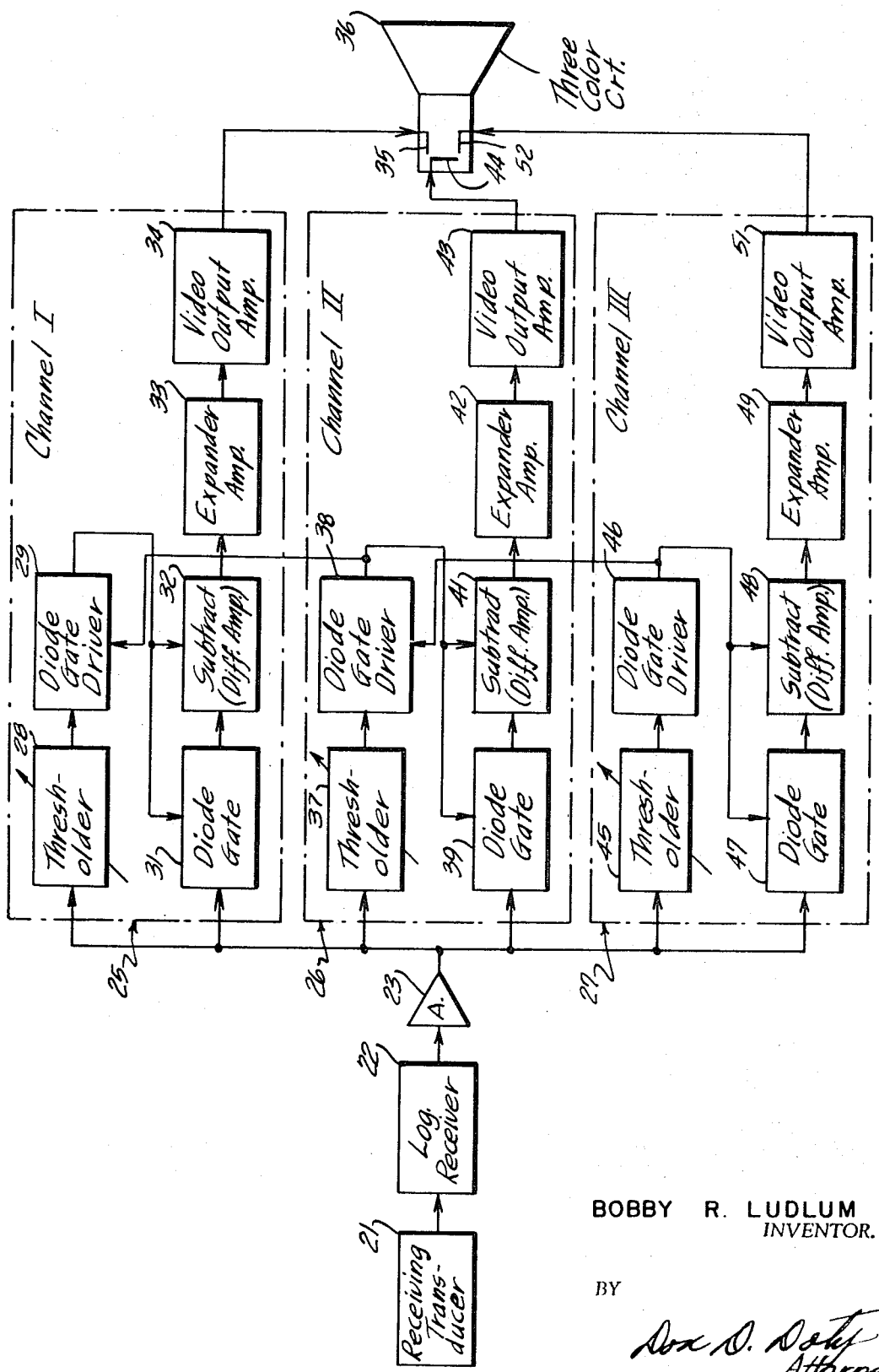

LOGARITHMIC THREE-COLOR DISPLAY SONAR

STATEMENT OF GOVERNMENT INTEREST

The invention described herein may be manufactured and used by or for the Government of the United States of America for governmental purposes without the payment of any royalties thereon or therefor.

FIELD OF INVENTION

The present invention relates generally to echo-search-ranging systems and, in particular, is a logarithmic sonar receiver system that incorporates a three-color display.

DESCRIPTION OF PRIOR ART

In the past, echo-search-ranging systems, such as, for instance, radar or sonar systems, have incorporated the conventional "black and white" cathode-ray tube and suitable electronic circuitry associated therewith for the proper energization thereof. In such tubes and circuitry, the position of a brightened area on the tube face indicates the relative position of a received target, and the intensity or brightness thereof is indicative of the relative amplitude or strength thereof. The dynamic range of brightness levels that such a tube can produce is a function of, among other things, the screen phosphor and the construction of the tube. For example, the brightness level of such tubes is usually limited by the reflections within the tube itself and the ambient light. Generally speaking, the dynamic range is poorer for tubes with long persistence phosphors, and, of course, the poorer the dynamic range, the greater the limitation thereon. If the system gain is adjusted so that the strongest signal received just fails to saturate the cathode-ray tube, then the weakest signal displayed thereby may be only as much as 28 db. or as little as 8 db. below the strongest signal. If the system gain is increased sufficiently for the weaker target signals to be displayed, then the stronger target signals will saturate the display, thereby resulting in a loss of definition. Loss of definition, of course, prevents a human observer from properly interpreting the information read out by the cathode-ray tube. Hence, although suitable for many practical purposes, the aforementioned prior art leaves a great deal to be desired.

SUMMARY OF THE INVENTION

Most of the disadvantages of the aforesaid prior art systems are overcome by the subject invention, since, among other things, it incorporates a receiver whose transfer characteristic is a logarithmic function which, in turn, allows it to accept a wide range of input signals levels without saturating. Hence, the entire receiver-display system may have a dynamic range that may be as great as 70 db. Such improved results are also effected because the logarithmically compressed output signal from the aforesaid receiver is divided into three video voltage ranges corresponding to three 23.3 db. target range receiver input voltages which may, for example, be successively combined to cover a total range of −80 to −10 db. (ref. 1 volt r.m.s.). Further more, sad three receiver output video voltages are respectively expanded in such manner within three video channels as to effect linearity of each thereof over a given 23.3 db. range of receiver input signals. Then these expanded linear signals are applied to the intensity grids of a three-color cathode-ray tube for the intensity modulation thereof. As a result, the 70 db. range of receiver input signals is displayed by three readily distinguishable colors, each of which corresponds to one-third of the total range. Hence, the visual observation of any one of said colors automatically informs a human or other operator that the echo level of the target acquired by the subject system lies within a particular one of said three ranges, thereby eliminating any necessity of further considering the other two.

It is, therefore, an object of the invention to provide an improved echo-search-ranging system.

Another object of this invention is to provide an efficient signal receiver system with improved resolution and color coded target echo level readouts.

Still another object of this invention is to provide an improved sonar system for logarithmically compressing and expanding received acoustical signals and for effecting the readout thereof in terms of color-coded target echo level signals.

A further object of this invention is to provide a method and means for increasing the dynamic range of a sonar system.

Another object of this invention is to provide an improved dynamic range sonar system with an improved resolution readout of the dynamic range thereof.

A further object of this invention is to provide an improved method and means for color coding or relating predetermined input signals.

Another object of this invention is to provide a method and means for separating the total distance range of sonar and other target search systems into a plurality of predetermined distance ranges and for reading out said plurality of distance ranges by a like plurality of color displays, respectively.

Another object of this invention is to provide an improved linear display means for echo-search-ranging systems, such as sonars, radars, and the like.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a broad, general, functional block diagram of an echo-search-ranging system which incorporates the subject invention;

FIG. 2 is a block diagram of the receiver portion of the system of FIG. 1;

FIG. 3 is a schematic block diagram of the logarithmic receiver of FIG. 2; and

DESCRIPTION OF THE PREFERRED EMBODIMENT

Figure 4:
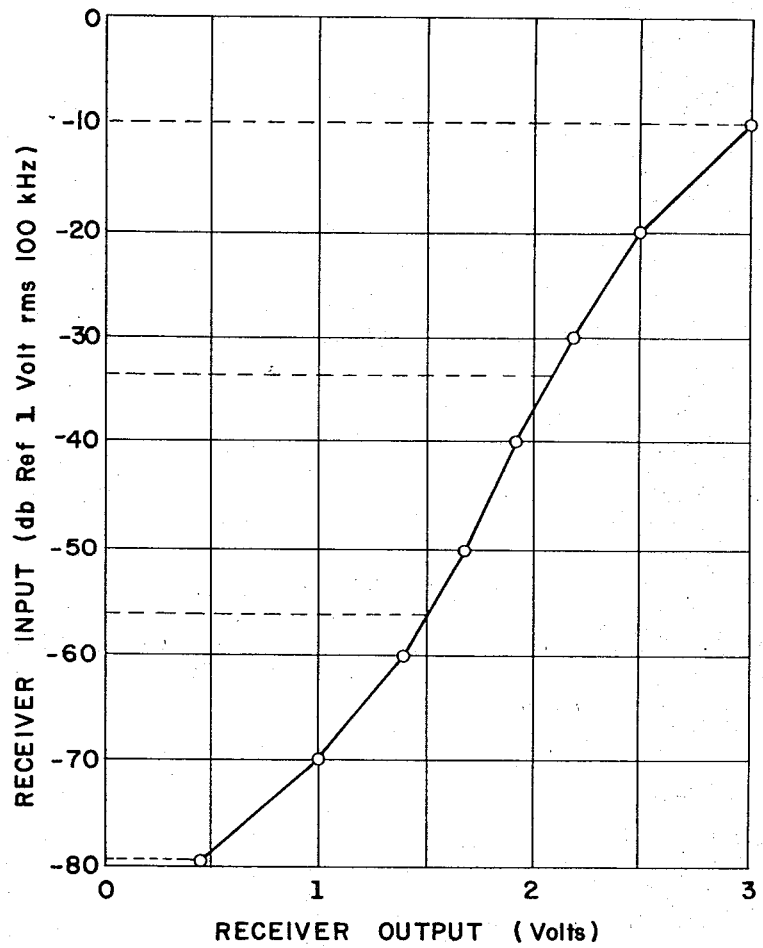
FIG. 4 is a graphical representation of the voltage transfer characteristics of the logarithmic receiver of FIG. 3.

Referring now to FIG. 1, wherein there is depicted an exemplary situation wherein the subject invention may be employed to an advantage, there is shown a transmitter 11 which broadcasts energy 12 throughout an environmental medium 13 for impact upon a target 14. Energy 12 is then reflected from target 13 as echo 15, which travels back to the receiver system 16.

In order to facilitate the disclosure of this invention in terms suitable for the simple explanation thereof, the preferred embodiment thereof is disclosed herewith as being a sonar system. However, it should be understood that the invention is not intended to be limited to such system, inasmuch as the concept thereof is apropos to any echo-search-ranging system which is searching for any suitable target within any particular environmental medium. Obviously, the environmental medium involved in any given operational circumstances will determine the type of energy broadcast by transmitter 11 and received by receiver 16. And, thus, it may readily be seen that the choice of many of parameters incorporated in transmitter 11 and receiver 16 will be contingent upon the type of energy broadcast as energy 12. Consequently, it should be understood that not only may the subject system be a sonar system, it may also be a radar system or any other electrical, mechanical, electromagnetic, or radiation responsive system which facilitates the seeking and acquiring one or more targets within a predetermined environmental medium. Obviously, it would be well within the purview of one skilled in the art having the benefit of the teachings presented herewith to make the proper design selections for the proper construction of the aforesaid transmitter 11 and receiver 16, in order to make them compatible with the environmental medium within which they are operating.

Referring now to FIG. 2, wherein there is shown a detailed block diagram of a preferred embodiment of a receiver system which may be incorporated in the system of the above-mentioned FIG. 1. Disclosed therein is a receiving transducer 21, which is of the type necessary to receive the energy broadcast by the aforementioned transmitter 11. The output thereof is connect to the input of a logarithmic signal compressing receiver 22, the output of which is coupled through an amplifier 23 to the input of a signal processor 24 having a trio of channels 25, 26 and 27.

In this particular instance, because only a three-color readout is being disclosed, signal processor 24 is disclosed as containing only three channels. However, if so desired, the number of channels is not intended to be limited to three and, therefore, any plurality thereof may be used which would make signal processor 24 compatible with one or more cathode-ray tube or other types of readouts capable of displaying a like plurality of colors or other indicia with good resolution.

The output of the aforesaid amplifier 23 is connected to the data signal input of a preset thresholder 28 in channel 24, the output of which is connected to the data signal input of a normally open diode gate driver 29 which, in addition to the aforesaid data signal input, contains a gating signal input as well.

The output of diode gate driver 29 is connected to the gating input of a normally closed diode gate 31, which also has a data signal input as well. The data signal input thereof is, likewise, connected to the output of the aforesaid amplifier 23, and the output of diode gate 31 is connected to one of the inputs of a subtractor circuit 32, with the other input thereof connected to the output of said diode gate driver 29. Subtractor circuit 32, of course, may be of any suitable circuit which subtracts the output signal of diode gate driver 29 from the output signal of diode gate 31 and, accordingly, for this purpose, it may be a differential amplifier. The output of subtractor circuit 32 is coupled to the input of an expander amplifier 33 having an expansion function which is substantially equal to and the inverse of the logarithmic compression function of the aforementioned logarithmic receiver 22, and the output thereof is coupled through a video output amplifier 34 to one of the color cathodes 35 of a three-color cathode-ray tube 36.

As previously mentioned, cathode-ray tube may be capable of displaying any plurality of distinguishable colors which are respectively compatible with the plurality of channels in signal processor 24. For example, in the event that four colors are available within the tube, it may be connected to four channels within signal processor 24, etc. Ordinarily, for most practical purposes, cathode-ray tube 36 will be a conventional, commercially available color cathode ray tube.

One of the inputs of channel 26 of processor 24 is located at present threshold 37; therefore, the data signal input thereof is connected to the output of amplifier 23. The output thereof is connected to the data signal input of a normally open diode gate driver 38, which also includes a gating input as well. The output of diode gate driver 38 is connected to the gating input of the aforesaid diode gate driver 29 of channel 25 and also to the gating input of a normally closed diode gate 39. The data signal input of diode gate 39 is connected to the output of the aforesaid amplifier 23, and the output thereof is connected to one of the inputs of a subtractor circuit 41, the other input of which is connected to the output of the aforesaid diode gate driver 38. Subtractor circuit 41 should be so designed as to subtract the output signal of diode gate driver 38 from the output signal of diode gate 39, and to do so a differential amplifier may be used. The output of subtractor circuit 41 is connected to the input of an expander amplifier 42 which, likewise, contains expansion characteristics which are substantially equal to and the inverse of the compression characteristics of the aforesaid logarithmic receiver 22. The output of expander amplifier 42 is coupled through a video output amplifier 43 to another of the color cathodes 44 of three-color cathode-ray tube 36.

The third channel 27 of the signal processor 24, likewise, has a preset thresholder 45, the data signal input of which is connected to the output of the aforesaid amplifier 23. The output of thresholder 45 is coupled to the input of a normally open diode gate driver 46, the output of which is connected to the gating input of the aforesaid diode gate driver 38 of channel 26 and to the gating input of a normally closed diode gate 47. The data signal input of diode gate 47 is connected to the output of the aforesaid amplifier 23, and the output thereof is connected to one of the inputs of a subtractor circuit 48. The other input to subtractor circuit 48 is connected to the output of diode gate 46, so that the output signal of diode gate driver 46 may be subtracted from the output signal of diode gate 47. To effect such subtraction, like in subtractors 32 and 41, subtractor circuit 48 may also be a differential amplifier, if so desired. The output of subtractor circuit 48 is coupled to the input of an expander amplifier 49 which, likewise, inherently incorporates expansion characteristics which are substantially equal to and the inverse of the compression characteristics of the aforesaid logarithmic receiver 22. The output of expander amplifier 49 is coupled through a video output amplifier 51 to the remaining color cathode 52 of three-color cathode-ray tube 36.

At this time, it would perhaps be noteworthy that each of the aforementioned expander amplifiers 33, 42, and 49 are respectively designed as so indicated in order to make the overall transfer characteristic of receiver 22 and display 36 substantially linear.

Referring now to FIG. 3, there is shown a preferred embodiment of the aforementioned logarithmic receiver 22 of FIG. 2. Disclosed therein, are input terminals 61 and 62 which are respectively connected to the terminals of primary winding 63 of an input transformer 64. Said input terminals are, of course, connected to suitable outputs of a receiving transducer, such as that indicated as receiving transducer 21 in FIG. 2. Secondary winding 65 of transformer 64 has one terminal thereof connected to the base of NPN transistor 66, and the other terminal thereof connected through a resistor 67 to a ground 68. A capacitor 69 is connected in parallel with resistor 67, and the ungrounded plate thereof is connected through a resistor 71 to a first positive direct current voltage, which, for example, may be of the order of +19.5 volts. A capacitor 72 is connected between said first direct current voltage and said ground. The emitter of the aforesaid transistor 66 is connected through a pair of series connected resistors 73 and 74 to ground, and connected in parallel with said resistor 74 is a capacitor 75. The collector of transistor 66 is connected through a resistor 76 to the aforesaid first direct current voltage.

The collector of the aforesaid transistor 66 is also connected to the base of an NPN transistor 77, the collector of which is connected to the aforesaid first direct current voltage. The emitter of transistor 77 is connected through a resistor 78 to ground. The emitter of transistor 77 also acts as the output of an emitter-follower isolation circuit 79 which, in combination with the aforesaid circuitry of transistor 66, comprises a preamplifying circuit 81.

The aforementioned first direct current voltage is connected through a voltage dropping resistor 82 to a second direct current voltage which is greater than said first direct current voltage and may, for example, be of the order of +21 volts.

The output from emitter-follower 79 is taken from the emitter of transistor 77, and it is connected through a capacitor 83 to the base of an NPN transistor 84 located in logarithmic (or other nonlinear) compression amplifier 85. Said base of transistor 84 is coupled through a resistor 86 to ground and through a pair of series connected resistors 87 and 88 to said second direct current voltage. The junction of series connected resistors 77 and 78 is connected through a resistor 89 to the base of an NPN transistor 91. The collector of transistor 91 is directly connected to the aforesaid second direct current voltage, and the emitter thereof is connected to the base of another NPN transistor 92. The emitter of transistor 92 is connected through a resistor 93 to the collector of the aforesaid transistor 84. The emitter of said transistor 84 is connected through a resistor 94 to ground, and the collector thereof is connected through a capacitor 95 to the base of the aforesaid transistor 91.

The output of logarithmic compression amplifier 85 is taken from the collector of transistor 84 and, hence, said collector is connected to the base of an NPN transistor 96 located in an emitter-follower isolation circuit 97. The base of transistor 96 is connected through a capacitor 98 to the anode of a diode 99, the cathode of which is connected to ground. The junction of capacitor 98 and diode 99 is connected to the cathode of another diode 101, the anode of which is connected to ground. The collector of transistor 96 is connected directly to said second direct current voltage, and the emitter thereof is connected through a resistor 102 to ground.

The emitter of transistor 96 of emitter-follower circuit 97 constitutes the output thereof and is connected through a series connected resistor 103 and capacitor 104 to a 100 kHz. band-pass filter 105. Capacitor 104, as readily may be seen, is connected to the junction of capacitor 106, the other plate of which is connected to ground. An inductance 107 is connected in parallel with capacitor 106. The common junction of capacitors 104 and 106 and inductance 107 is connected through another capacitor 108 to the common junction of a parallel connected inductance 109 and capacitor 111, the other terminals of which are connected to ground.

The ungrounded common junction of inductance 109 and capacitor 111 is connected through a capacitor 112 to the base of an NPN transistor 113 of an amplifier circuit 114. The base of transistor 113 is connected through a resistor 115 to ground and though a resistor 116 to the aforesaid second direct current voltage. The emitter of transistor 113 is connected through a variable resistor 117 to ground, with a capacitor 118 connected between the movable arm thereof and ground. The collector of transistor 113 is coupled through a resistor 119 to said second direct current voltage.

The output of amplifier 114 is taken from the collector of transistor 113 and is connected through a capacitor 121 to the base of an NPN transistor 122 located in a detector circuit 123. The base of transistor 122 is connected through a resistor 124 to ground and through a resistor 125 to the aforesaid second direct current voltage. The collector of transistor 122 is connected directly to said second direct current voltage and the emitter thereof is connected through a pair of series connected resistors 126 and 127 to ground, with the latter mentioned resistor having a capacitor 128 connected in parallel therewith.

The output of detector circuit 123 is taken from the common junction of series connected resistors 126 and 127, and, hence, it is connected to an output terminal 129 which, of course, constitutes the output of the entire circuit of logarithmic receiver 22.

MODE OF OPERATION

The operation of the subject invention will now be discussed briefly in conjunction with all of the figures of the drawing.

As previously mentioned, the principles and structural combinations incorporated in the subject invention are applicable to any given environment, as long as they are respectively designed therefor. However, for the purpose of making this disclosure as simple as possible, the invention will be discussed as if it were a sonar system operating to locate a target within a subaqueous medium, such as, for example, water, sea water, or the like.

As may readily be seen in FIG. 1, the instant invention includes a sonar transmitter 11 which broadcasts acoustical energy 12 throughout subaqueous environmental medium 13 in search of target 14. Upon acquiring target 14 said acoustical energy is reflected therefrom and, thus, becomes echo 15 which is received by receiver 16 and processed therein in such manner as to be readout by a three-color display which is more readily subject to interpretation by human or other operator than a monochromatic display would be.

The type of signal processing which occurs within the aforementioned receiver 16 is disclosed in greater detail in the functional block diagram of FIG. 2 and, to simplify the disclosure thereof, it will also be discussed herewith as if it were inherently designed to be a sonar receiving system.

As is well known in the sonar art, an exceedingly important parameter in sonar receiver systems is dynamic range. It is a measure of the ratio of the maximum and minimum signal levels that can be effectively received and read out without receiver or display saturation. Of course, the primary limiting factor of such a system is the readout or display, inasmuch as it is the unit which has the most limited dynamic range. As previously mentioned, such dynamic range leaves a great deal to be desired within monochromatic cathode-ray tubes because the maximum primary level thereof is limited by the phosphor of the surface thereof, while the minimum primary level thereof is limited by adverse reflections within the tube, as well as by the level of the ambient light.

The dynamic range of a sonar system, including that of the instant invention, may be defined mathematically as 5PS $$DR = 20 \log_{10} \frac{V_B(\max.)}{V_B(\min.)} \qquad (1)$$

where
  $DR$ is the dynamic range in db.,
  $V_B(\max.)$ is the intensity modulating voltage that produces the maximum brightness level without saturation,
  $V_B(\min.)$ is the voltage that produces the minimum brightness level for any given ambient light level.

As may be seen from above equation (1), the dynamic range indicates the degree of limitation that may be imposed upon any sonar receiver system incorporating a conventional monochromatic cathode-ray tube. This is true, because if the system gain thereof is adjusted so that the strongest signal received just fails to saturate the display, then the weakest signal displayed may only be as much as, say, 28 db. or as little as 8 db. below the strongest received signal. And if the system gain is adjusted in such manner as to allow the weaker signals to be adequately displayed, then the stronger received signals will saturate the display cathode-ray tube, thereby resulting in considerable loss of definition.

It has been found that the subject invention provides a method and means of increasing the dynamic range of the receiver system thereof to as much as 70 db. and, perhaps, with optimizing designs incorporated therein, it would provide improvements thereover during any given operational circumstances.

The subject system, as shown in FIG. 2, includes a receiving transducer 21 which receives echo 15 and supplies it to receiver 22 whose transfer characteristics is a logarithmic compression function that allows it to accept a wide range of input signal levels without saturating. The voltage transfer characteristics of receiver 22 are shown in FIG. 4, and as depicted therein, The logarithmic compressed receiver output signal may be divided into three video voltage ranges, each of which correspond to 23.3 db. ranges of receiver input voltage, and all of which, when taken together, cover the range of −80 to −10 db. ref. 1 volt r.m.s.). The video voltage ranges 1, 2, and 3 depicted in FIG. 4 are expanded by amplifiers 33, 42, and 49 within three video channels, indicated as channels 25, 26, and 27 in FIG. 2, so that the receiver expander transfer characteristic in each channel is linear over each of the three 23.3 db. ranges of receiver 22, and, hence, the overall receiver video system characteristic is linear, too. After further video amplification, said linear output video signals from channels 25 through 27 are then used to intensity modulate the three-color guns—preferably red, green, and blue—of a color cathode-ray type of readout.

In this particular instance, it has been found that the receiver range covers 70 db., and so the input signals are displayed by three colors, each color of which displays one-third of the total range or approximately 23.3 db.

The aforementioned logarithmic receiver 22 is shown in schematic detail in FIG. 3. It consists of five stages: a preamplifier 81, a logarithmic amplifier 85, a 100 kHz. band-pass filter 105, a post-filter amplifier 114, and an envelope detector 123. In preamplifier 81, transistor 66 is a low-noise common emitter amplifier, and the input thereto is supplied by means of transformer 64, terminals 61 and 62 of which are coupled to receive the input signals from transducer 21. Transistor 77 is included in emitter follower circuit 79, which prevents the undue loading of the collector circuit of the aforesaid transistor 66. Logarithmic amplifier 85 derives its response from the nonlinear volt-ampere characteristic of a pair of back-to-back 1N914 silicon diodes 99 and 101, in which the current is a function of the diode voltage and may be expressed by the equation $$I = I_o \exp(q/mKT) V, \quad (2)$$

where
$I$ is diode current in amps,
$I_o$ is diode reverse saturation current in amps,
$q$ is the electron charge,
$m$ is a factor generally falling between 1.0 and 2.0, which represents the effects of diffusion current flow and carrier generation recombination,
$V$ is voltage across the diode,
$T$ is temperature in degrees F., and
$K$ is a constant.

The diode voltage, then, is a logarithmic function of the diode current. This relationship holds true over several decades of current for several types of silicon diodes and, thus, such types of diodes perform quite satisfactorily within the presently discussed logarithmic receiver circuit.

Transistors 91, 92, and 96 form a boot-strapped, high-output impedance current driver for the aforementioned 1N914 silicon diodes 99 and 101. Transistor 96, of course, is included in emitter follower 97 which, in turn, is included in the subject circuit to prevent the loading of the aforesaid diode current driver.

Band-pass filter 105 consists of two capacitively coupled resonant sections. It is tuned to 100 kHz. and has a 6 db. band-pass of about 10 kHz.

Amplifier 114 is a straightforward common emitter gain stage, and detector 123, connected to the output thereof through transistor 122, operates as an envelope detector.

The output of receiver 22 is taken from the common junction of resistors 126 and 127 located within detector 123, and it is coupled to output terminal 128, from which the voltage transfer characteristics comparable to that shown in FIG. 4 are obtainable.

The video circuitry of signal processor 24 of FIG. 2 has three main functions. First, the common video amplifier output voltage is divided into three ranges corresponding to three consecutive 23.3 db. ranges of logarithmic receiver input voltage. Second, each of the ranges is expanded in a separate channel, so that the overall transfer characteristics of each channel and the logarithmic receiver of each of the 23.3 db. ranges of input signals is linear. Third, the expanded video signals are then amplified sufficiently to enable them to intensity modulate the three-color cathodes of cathode-ray tube 36.

As will be seen, the division of video signals into three amplitude ranges is accomplished by preset thresholders, diode gate drivers, diode gates, and subtract circuits of channels 25, 26, and 27. Integrated circuit differential comparators operate as level detectors or thresholders 28, 37, and 45, and respectively control the turning on or opening all of the normally closed diode analog gates 31, 39, and 47 located in the video signal path. When the video input voltage rises above the comparator reference voltage set into the thresholder of a given channel, the diode gate thereof is turned on or opened, allowing the video signals to pass to its respective expander amplifier. The channels are interconnected in such manner that the outputs of the diode gate drivers inhibits or inactivates channels of lower thresholder settings. Thus, diode gate driver of channel 3 is connected to inhibit or close normally open diode gate driver 38 of channel 2, and the output of diode gate driver 38 of channel 2 is connected to inhibit or close normally open diode gate driver 39 of channel 1. Of course, the inhibiting of diode gate driver 38 by the presence of an output signal at diode gate driver 46 also acts through diode gate driver 38 to, in turn, effect the inhibiting of diode gate driver 29. As a result of such inhibitions only one channel of the trio of channels supplies an output signal to cathode ray 36 at any given instant for any given acquired target.

The video signals from each of channels 25, 26, and 27 are respectively expanded by expanders 33, 42, and 49, the latter of which are preferably common emitter resistor amplifiers with resistor diode networks in the emitter circuits thereof for providing a nonlinear amplification characteristic at the outputs thereof. The voltage gain varies with the input level signal, and the nonlinear gain characteristic is an approximation of the characteristic required to linearize the overall receiver-display transfer characteristic by compensating for the compression characteristics of logarithmic receiver 22.

Video output amplifiers 34, 43, and 51 are preferably common emitter shunt-peaked transistor-type amplifiers, which are used to amplify the respective expanded video signals of channels 25, 26, 27 to levels sufficient to modulate the cathode voltages of three-gun cathode-ray tube 36. All video circuitry from the output of logarithmic receiver detector 123 to the cathode-ray tube cathodes of cathode-ray tube 36 is direct coupled: therefore, no direct current restoration is required. If the magnetic deflection cathode of cathode-ray tube 36 is operated at approximately 30 volts positive with respect to ground, no problem arises in the use of a transistorized video output stage or in using direct coupling.

In view of the foregoing, it may readily be seen that the respective ranges of the trio of readout ranges are effectively separated by means of three signal levels supplied thereto, each of which is separated from adjacent ones thereof by a set voltage. Of course, any signal level applied is that which is supplied by amplifier 23 of FIG. 2, and it would be the same for the input of all three channels. But in view of the respective settings of thresholders 28, 37, and 45, only one of the channels is capable of being responsive to the input video signal for a given range of video signal levels. In addition, it may readily be seen that because target distance and echo signal intensity are inversely proportional, the latter may be used to separate the total sonar range into three ranges which correspond to said thresholder settings, respectively, for targets having substantially identical target strength characteristics. And when each of said ranges is read out by a different color of a color cathode-ray tube, the readout efficiency is increased to a considerable extent.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:
1. A target system, comprising in combination:
means for receiving a signal from a target located within a predetermined environmental medium;
means connected to the output of said receiving means for compressing the signal received thereby in accordance with a predetermined nonlinear mathematical function;
first means effectively connected to the output of said received signal compressing means for passing said compressed signal whenever the level thereof exceeds a first preset voltage, said first means including a preset thresholder effectively connected to the output of the aforesaid first signal compressing means; a normally open diode gate driver having a data signal input, a gating input for effecting the closure thereof in response to a predetermined gating signal, and an output, with the data signal input thereof connected to the output of said thresholder; a diode gate having a data signal input, a gating input, an output, with the data signal input thereof effectively connected to the output of the aforesaid received signal compressing means, and with the gating input thereof connected to the output of said diode gate driver; and a subtract circuit having a pair of inputs and an output, with one of the inputs thereof connected to the output of said diode gate, and with the other input thereof connected to the output of the aforesaid diode gate driver;

means connected to the output of the subtract circuit of said compressed signal passing means for amplifying the signal passing thereby in accordance with a mathematical function that is substantially equal to and the inverse of the predetermined nonlinear compressing mathematical function of the aforesaid received signal compressing means; and means effectively connected to the output of said compressed signal amplifying means for reading out said amplified signal as a first predetermined color display.

2. The device of claim 1 wherein said means for receiving a signal from a target located within a predetermined environmental medium comprises a transducer.

3. The device of claim 1 wherein said means connected to the output of said receiving means for compressing the signal received thereby in accordance with a predetermined nonlinear mathematical function comprises a logarithmic compression receiver.

4. The device of claim 1 wherein said means connected to the output of the subtract circuit of said compressed signal passing means for amplifying the signal passed thereby in accordance with a mathematical function that is substantially equal to and the inverse of the predetermined nonlinear compressing mathematical function of the aforesaid received signal compressing means comprises a logarithmic expander amplifier.

5. The device of claim 1 wherein said means effectively connected to the output of said compressed signal amplifying means for reading out said amplified signal as a first predetermined color display comprises a cathode-ray tube.

6. The invention of claim 1 further characterized by means operationally associated with said receiving means for broadcasting a predetermined target search signal throughout said environmental medium that is capable of being received by said receiving means after being reflected by said target.

7. The invention of claim 1 further characterized by:
second means effectively connected to the output of said received signal compressing means for simultaneously inactivating said first compressed signal passing means and passing said compressed signal whenever the level thereof exceeds a second preset voltage that is a given amount greater than said first preset voltage;
second means connected to output of said second inactivating and passing means for amplifying the signal passed thereby in accordance with a mathematical function that is substantially the inverse of the predetermined nonlinear compressing mathematical function of the aforesaid received signal compressing means;
third means effectively connected to the output of said received signal compressing means for simultaneously inactivating said first and second compressed signal passing means and passing said compressed signal whenever the level thereof exceeds a third preset voltage that is a given amount greater than said second preset voltage;
third means connected to the output of said second inactivating and passing means for amplifying the signal passed thereby in accordance with a mathematical function that is substantially the inverse of the predetermined nonlinear compressing mathematical function of the aforesaid received signal compressing means; and
means combined with the aforesaid readout means connected to the outputs of said second and third amplifying means for reading out the amplified signals therefrom as second and third predetermined color displays.

8. A sonar system comprising in combination:

a transducer for receiving an acoustical signal from a target located within an aqueous medium and converting it into an electrical output signal proportional thereto;

a receiver connected to the output of said receiving transducer for compressing the electrical output signal therefrom in accordance with a predetermined nonlinear mathematical function;

a first channel connected to the output of said receiver for passing the compressed signal therefrom whenever it exceeds a first predetermined voltage level and for amplifying it in accordance with a mathematical function that is substantially equal to and the inverse of the aforesaid receiver signal compression function;

a second channel connected to said first channel and to the output of said receiver for inhibiting said first channel, for passing the compressed signal therefrom whenever it exceeds a second predetermined voltage level that is a given amount greater than said first predetermined voltage level, and for amplifying said passed signal in accordance with a mathematical function that is substantially equal to and the inverse of the aforesaid receiver mathematical signal compressing function;

a third channel connected to said channel, effectively connected to said first channel, and connected to the output of said receiver for inhibiting said first and second channels, for passing the compressed signal therefrom whenever it exceeds a third predetermined voltage level that is a given amount greater than said second voltage level, and for amplifying said passed signal in accordance wit a mathematical function that is substantially equal to and the inverse of the aforesaid receiver mathematical signal compressing function; and a three-color readout having a trio of inputs respectively connected to the outputs of said first, second, and third channels for reading out the amplified output signals therefrom as a trio of different colors.

9. The device of claim 8 wherein said receiver connected to the output of said receiving transducer for compressing the electrical output signal therefrom in accordance with a predetermined nonlinear mathematical function comprises a logarithmic compression receiver.

10. The device of claim 8 wherein said three-color readout having a trio of inputs respectively connected to the output of said first, second, and third channels for reading out the amplified output signals therefrom as a trio of different colors comprises a three-color cathode-ray tube.

11. The invention of claim 8 further characterized by a transmitter for broadcasting a predetermined acoustical target search signal throughout said aqueous medium that is capable of being received by said receiving transducer after it has been reflected by said target.

12. The device of claim 8 wherein said first, second, and third channels each comprises:
a preset thresholder effectively connected to the output of said receiver for passing a signal supplied thereto when it exceeds predetermined voltage level;
a diode gate driver having a data signal input, a gating input, and an output, with the data signal input thereof connected to the output of said thresholder;
a diode gate having a data signal input, a gating input, and an output, with the data signal input thereof effectively connected to the output of said receiver, and with the gating input thereof connected to the output of the aforesaid diode gate driver;
a subtract circuit having a pair of inputs and an output, with one of the inputs thereof connected to the output of said diode gate, and with the other input thereof connected to the output of the aforesaid diode gate driver;
an expander amplifier connected to the output of said subtract circuit for amplifying the output signal therefrom in accordance with a mathematical function which is substantially equal to and the inverse of the predetermined nonlinear mathematical function of the aforesaid receiver.

13. The invention of claim 12 further characterized by a video output amplifier having an input and an output, with the input thereof connected to the output of said expander amplifier, and with the output thereof adapted for being connected to one of the trio of inputs of the aforesaid three-color readout.